United States Patent
Sato

(10) Patent No.: US 8,450,631 B2
(45) Date of Patent: May 28, 2013

(54) PRESERVING APPARATUS FOR WELDED JOINT PORTION AND PRESERVING METHOD THEREFOR

(75) Inventor: Seiichi Sato, Tokyo (JP)

(73) Assignee: IHI Corporation, Tokyo (JP)

(*) Notice: Subject to any disclaimer, the term of this patent is extended or adjusted under 35 U.S.C. 154(b) by 1266 days.

(21) Appl. No.: 12/296,546

(22) PCT Filed: Apr. 11, 2006

(86) PCT No.: PCT/JP2006/307661
§ 371 (c)(1),
(2), (4) Date: Oct. 9, 2008

(87) PCT Pub. No.: WO2007/116532
PCT Pub. Date: Oct. 18, 2007

(65) Prior Publication Data
US 2009/0166338 A1  Jul. 2, 2009

(51) Int. Cl.
*B23K 9/04* (2006.01)
*B23K 9/173* (2006.01)
*B23K 15/06* (2006.01)

(52) U.S. Cl.
USPC .... 219/76.1; 219/74; 219/73.21; 219/121.21; 219/121.22

(58) Field of Classification Search
USPC ............... 219/76.1, 603, 604, 617, 648, 651, 219/756, 757, 765, 72, 73.21, 74, 121.15, 219/121.21, 121.22, 121.23, 121.24, 121.55, 219/130.01, 136, 137.42, 137.9, 415, 73, 219/73.1, 73.11, 73.2
See application file for complete search history.

(56) References Cited

U.S. PATENT DOCUMENTS 3,424,887 A    1/1969  Fehlman
4,029,930 A *  6/1977  Sagara et al. ............ 219/74
(Continued)

FOREIGN PATENT DOCUMENTS

EP    0422993 A1    4/1991
JP    62-143762     9/1987
(Continued)

OTHER PUBLICATIONS

International Search Report for PCT/JP2006/307661 dated Jul. 6, 2006.

(Continued)

*Primary Examiner* — Joseph M Pelham
*Assistant Examiner* — Gyounghyun Bae
(74) *Attorney, Agent, or Firm* — McCormick, Paulding & Huber LLP

(57) ABSTRACT

A preserving apparatus for preserving welded joint portions 7, 8 by deposit welding on the inner surface of the welded joint portions 7, 8, in which a nozzle 4 and a pipe 5 supported under water are joined, the apparatus having: a seal member 9 that is disposed in front and behind the welded joint portions 7, 8 to be deposit welded within the nozzle 4 and pipe 5, and serves to demarcate and form a closed operation area A within the nozzle 4 and pipe 5; water drainage means 12 for draining the inside of the operation area A demarcated and formed by the seal member 9 and obtaining a gas atmosphere therein; and welding means 13 for deposit welding on the inner surface of the welded joint portions 7, 8 within the operation area A in which the gas atmosphere has been created.

12 Claims, 3 Drawing Sheets

U.S. PATENT DOCUMENTS

| | | | |
|---|---|---|---|
| 4,154,999 A * | 5/1979 | Pinfold et al. | 219/72 |
| 4,196,334 A * | 4/1980 | Thome | 219/61 |
| 4,302,652 A * | 11/1981 | Nobileau et al. | 219/72 |
| 4,894,512 A * | 1/1990 | Heusi et al. | 219/130.4 |
| 4,940,390 A * | 7/1990 | Clark et al. | 416/241 R |
| 5,217,156 A * | 6/1993 | Schnorrer | 228/219 |
| 5,435,478 A | 7/1995 | Wood et al. | |
| 5,523,540 A * | 6/1996 | Coldren et al. | 219/137 WM |
| 5,981,896 A * | 11/1999 | Keanini et al. | 219/74 |
| 6,555,779 B1 | 4/2003 | Obana et al. | |
| 6,564,990 B2 * | 5/2003 | Nagashima et al. | 228/219 |
| 6,881,925 B1 * | 4/2005 | Sato et al. | 219/121.73 |
| 2002/0195429 A1 * | 12/2002 | Fusaro et al. | 219/74 |
| 2005/0082342 A1 * | 4/2005 | Babb et al. | 228/112.1 |

FOREIGN PATENT DOCUMENTS

| | | |
|---|---|---|
| JP | 63-168278 A | 7/1988 |
| JP | 5323078 A | 12/1993 |
| JP | 10197679 A | 7/1998 |
| JP | 2001200585 A | 7/2001 |
| JP | 2001-219269 A | 8/2001 |
| JP | 2003-001478 A | 1/2003 |
| JP | 2005028405 A | 2/2005 |
| WO | 9001995 A1 | 3/1990 |

OTHER PUBLICATIONS

Extended European Search Report for EP Application No. 06 731 608.3 dated Feb. 21, 2011.

Official Communication for EP Application No. 06 731 608.3 dated Oct. 18, 2011.

* cited by examiner

PRESERVING APPARATUS FOR WELDED JOINT PORTION AND PRESERVING METHOD THEREFOR

CROSS REFERENCE TO RELATED APPLICATIONS

This application is entitled to the benefit of and incorporated by reference essential subject matter disclosed in International Patent Application No. PCT/JP2006/307661 filed on Apr. 11, 2006.

TECHNICAL FIELD

The present invention relates to an apparatus for deposit welding on the inner surface of a welded joint portion, in which a nozzle and a pipe supported under water are joined, and preserving the welded joint portion and to a method therefor.

BACKGROUND ART

In the field of pressure vessels of nuclear reactors such as a BWR (Boiling Water Reactor) or a PWR (Pressurized Water Reactor), there are concerns about (1) residual tensile stresses remaining on the inner surface of welded joint portions where a nozzle and a pipe provided in the pressure vessel are joined together and the (2) occurrence of SCC (Stress Corrosion Cracking).

In the pressure vessels of nuclear reactors, stress improvement by reducing the tensile stress remaining on the inner surface of the welded joint portions and, preferably, generating compressive stress on the inner surface of the welded portions has been performed by IHSI (Induction Heating Stress Improvement) or shot peening (peening) with the objective of preventing the occurrence of SCC on the inner surface of welded joint portions.

With the IHSI, a high-frequency induction coil is disposed on the outer periphery of a welded joint portion, a high-frequency electric current is passed to the high-frequency induction coil to heat the welded joint portion and vicinity thereof, while causing a flow of cooling water within the welded joint portion (nozzle and pipe), a difference in temperature between the inner and outer surfaces that is necessary for stress improvement is created, and then the welded joint portion is returned to normal temperature, thereby reducing tensile stresses remaining in the inner surface of the welded joint portion and generating compressive stresses in the inner surface of the welded joint portion.

With the peening, the inner surface of a welded joint portion is peened by a large number of balls called shots, whereby the inner surface of the welded joint portion is plastically deformed, tensile stresses remaining on the inner surface of the welded joint portion are reduced, and compressive stresses are generated in the inner surface of the welded joint portion.

However, in particular, in a pressure vessel of a pressurized water reactor, there is no sufficient clearance between the outer periphery of the welded joint portion (nozzle and pipe) and the nuclear reactor containment vessel (shielding wall, etc.) and, therefore, it is difficult to install a high-frequency induction coil on the pressure vessel and perform the IHSI.

In particular, in the pressure vessel of a pressurized water reactor, the pressure vessel is located in the lowermost portion of the nuclear reactor containment vessel and the pressure vessel itself has a high doses of radiation. As a result, peening has to be performed in a state in which the pressure vessel is filled with water and, therefore, the peening apparatus is difficult to install on the pressure vessel and peening is difficult to perform.

Accordingly, clad welding (CRC: Corrosion Resistant Cladding), by which a clad layer with high corrosion resistance is formed on the inner surface of a welded joint portion with the objective of preventing the occurrence of SCC on the inner surface of the welded joint portion, can be considered instead of stress improvement such as IHSI and peening (see, for example, Japanese Patent Application Laid-open No. H10-197679).

DISCLOSURE OF THE INVENTION

The following problems arise when clad welding is performed: (i) because the pressure vessel itself has a high doses of radiation, the pressure vessel is filled with water, and because no check valve is installed between a nozzle and a steam generator in a pressure vessel of a pressurized water reactor, the connected state of the nozzle and pipe is required and welding has to be performed under water; (ii) in the case of an operating nuclear reactor, there is a possibility of fine SCC already existing on the inner surface of welded joint portion of the pressure vessel.

Underwater laser welding is being developed as a method for resolving the problem (i). However, with the underwater laser welding, where fine SCC already exists on the inner surface of a welded joint portion, as indicated in (ii) above, when welding is performed on the SCC, the welding quality is difficult to ensure because of water vapor occurring due to evaporation of water contained in the SCC.

Accordingly, it is an object of the present invention to provide an apparatus that can ensure sufficient welding quality when deposit welding is performed on the inner surface of a welded joint portion in which a nozzle and pipe supported under water are joined, and a method therefor.

In order to attain the above-described object, the present invention provides a preserving apparatus for deposit welding on an inner surface of a welded joint portion, in which a nozzle and a pipe supported under water are joined, and preserving the welded joint portion, comprising: a seal member that is disposed in front and behind the welded joint portion to be deposit welded within the nozzle and the pipe, and serves to demarcate and form a closed operation area within the nozzle and the pipe; water drainage means for draining the inside of the operation area demarcated and formed by the seal member and creating a gas atmosphere therein; and welding means for deposit welding on the inner surface of the welded joint portion within the operation area in which the gas atmosphere has been created.

Here, the seal member may have a plurality of nozzle plugs that are inserted, with a predetermined spacing, into the nozzle and the pipe, and a seal tube that is provided so as to expand and contract on the outer periphery of each of the nozzle plugs and serves to seal the space between the nozzle plugs and the inner surfaces of the nozzle and the pipe.

Further, the welding means may have a guide rod that spans between the plurality of nozzle plugs, and a welding torch that is supported on the guide rod so that the welding torch can move freely in the axial direction and radial direction of the guide rod and can rotate freely in the circumferential direction.

The water drainage means may have a supply tube that supplies a gas into the operation area, and a discharge tube that drains the operation area as the gas is being supplied from the supply tube into the operation area.

Drying means may be provided for drying the welded joint portion prior to deposit welding on the inner surface of the welded joint portion.

Further, grinding means may be provided for grinding the welded joint portion.

Further, inspection means may be provided for inspecting the welded joint portion.

Further, shield gas supply means may be provided for supplying a shield gas into the operation area and creating the shield gas atmosphere within the operation area, prior to deposit welding on the inner surface of the welded joint portion.

The present invention also provides a method for deposit welding on an inner surface of a welded joint portion, in which a nozzle and a pipe supported under water are joined, and preserving the welded joint portion, wherein a closed operation area is demarcated and formed in front and behind the welded joint portion to be deposit welded, water is drained from within the demarcated operation area and a gas atmosphere is created therein, and deposit welding is performed on the inner surface of the welded joint portion within the operation area in which the gas atmosphere has been created.

Here, a gas may be supplied into the operation area and the operation area may be drained as the gas is being supplied into the operation area.

Further, the welded joint portion may be dried prior to deposit welding on the inner surface of the welded joint portion.

Further, the welded joint portion may be ground prior to deposit welding on the inner surface of the welded joint portion.

Further, the welded joint portion may be inspected prior to deposit welding on the inner surface of the welded joint portion.

Further, a shield gas may be supplied into the operation area and the shield gas atmosphere may be created within the operation area, prior to deposit welding on the inner surface of the welded joint portion.

Further, the welded joint portion may be ground after deposit welding on the inner surface of the welded joint portion.

Further, the welded joint portion may be inspected after deposit welding on the inner surface of the welded joint portion.

The present invention demonstrates an excellent effect of ensuring sufficient welding quality when deposit welding is performed on the inner surface of a welded joint portion in which a nozzle and a pipe supported under water are joined.

BEST MODE FOR CARRYING OUT THE INVENTION

The preferred embodiments of the present invention will be described below in greater detail with reference to the appended drawings.

Figure 1:
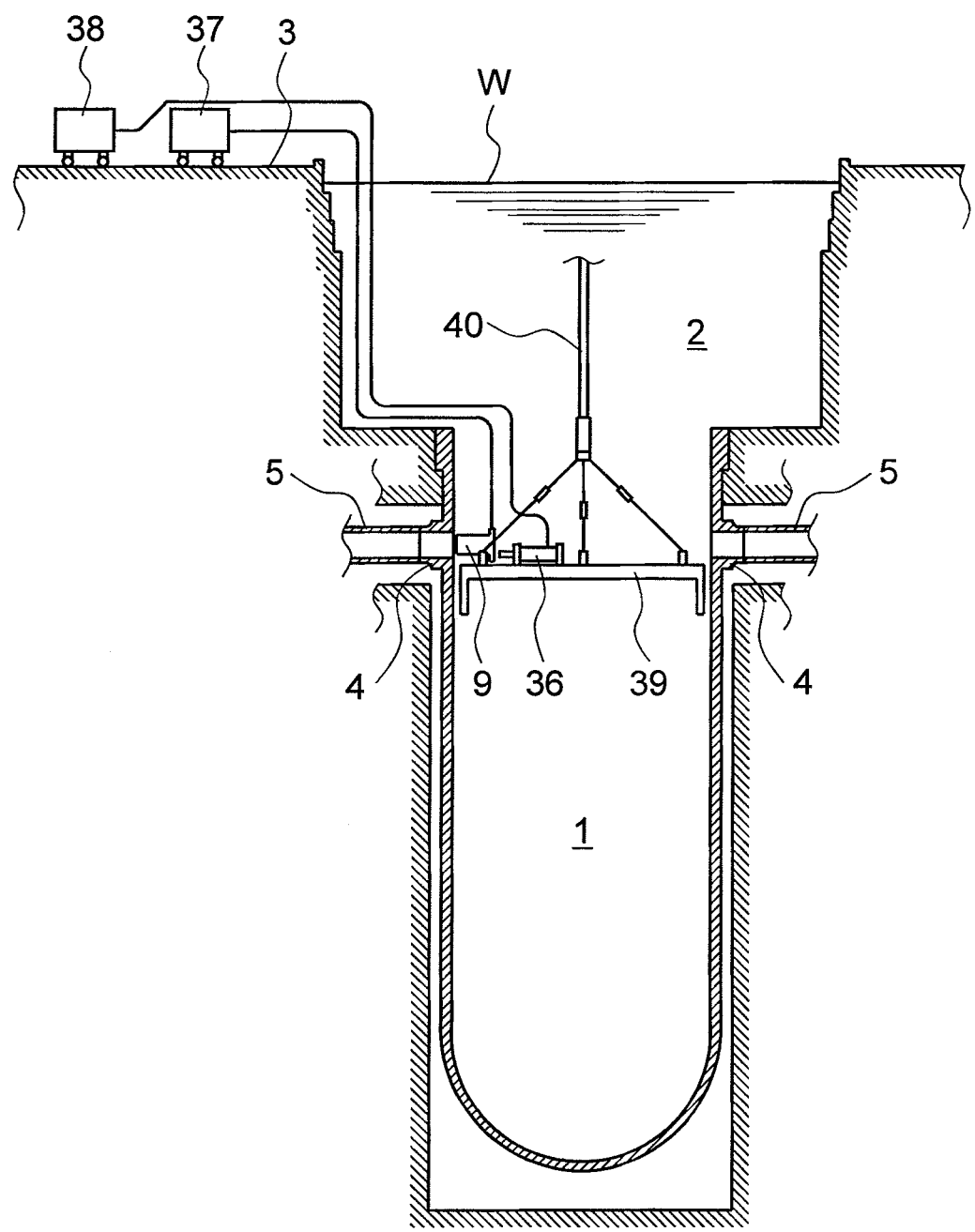
FIG. 1 is a schematic view of a nuclear reactor pressure vessel employing the preserving apparatus of an embodiment of the present invention.
Figure 2:
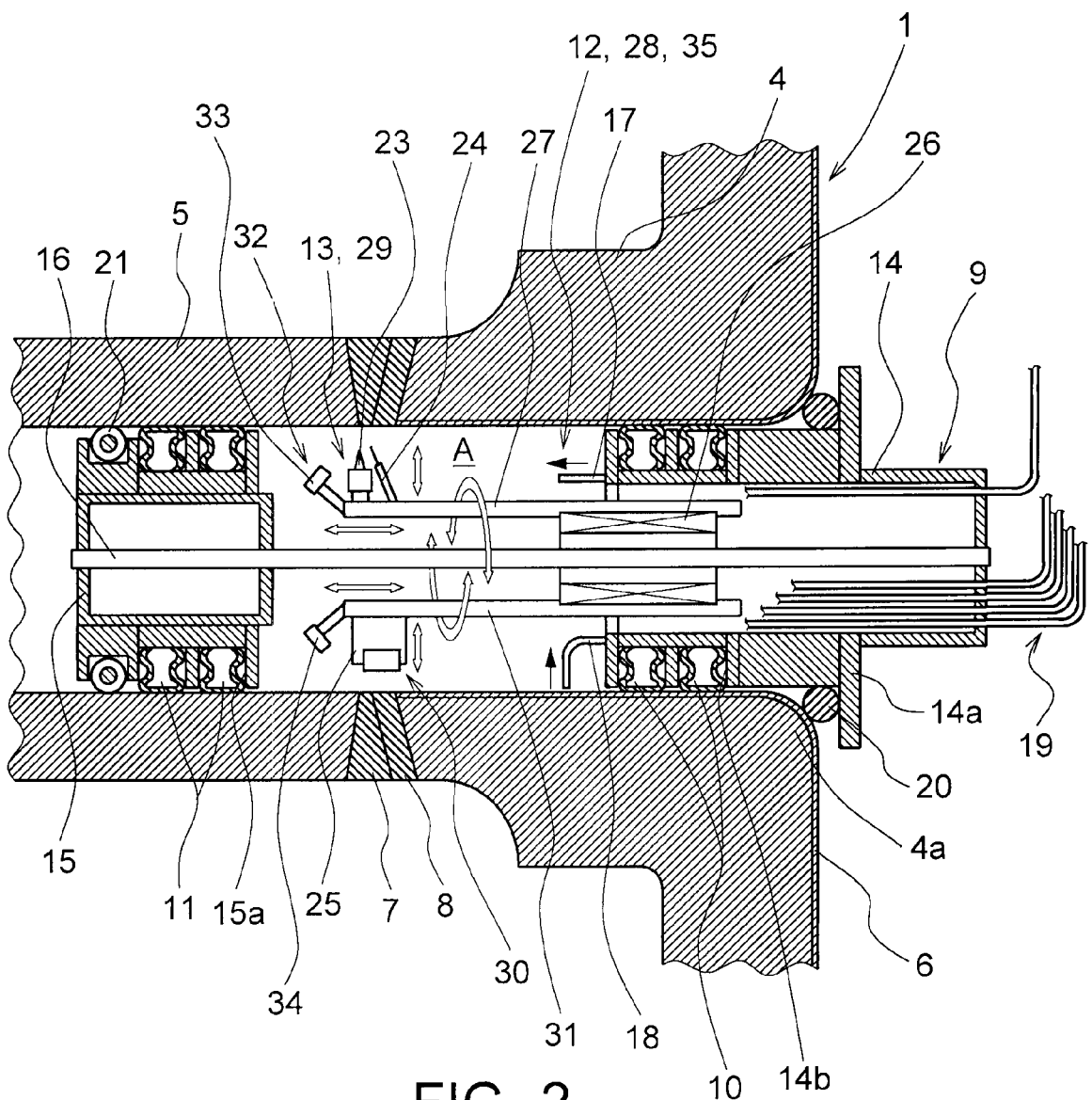
FIG. 2 is a cross-sectional view of a pressure vessel that illustrates a state prior to deposit welding.
Figure 3:
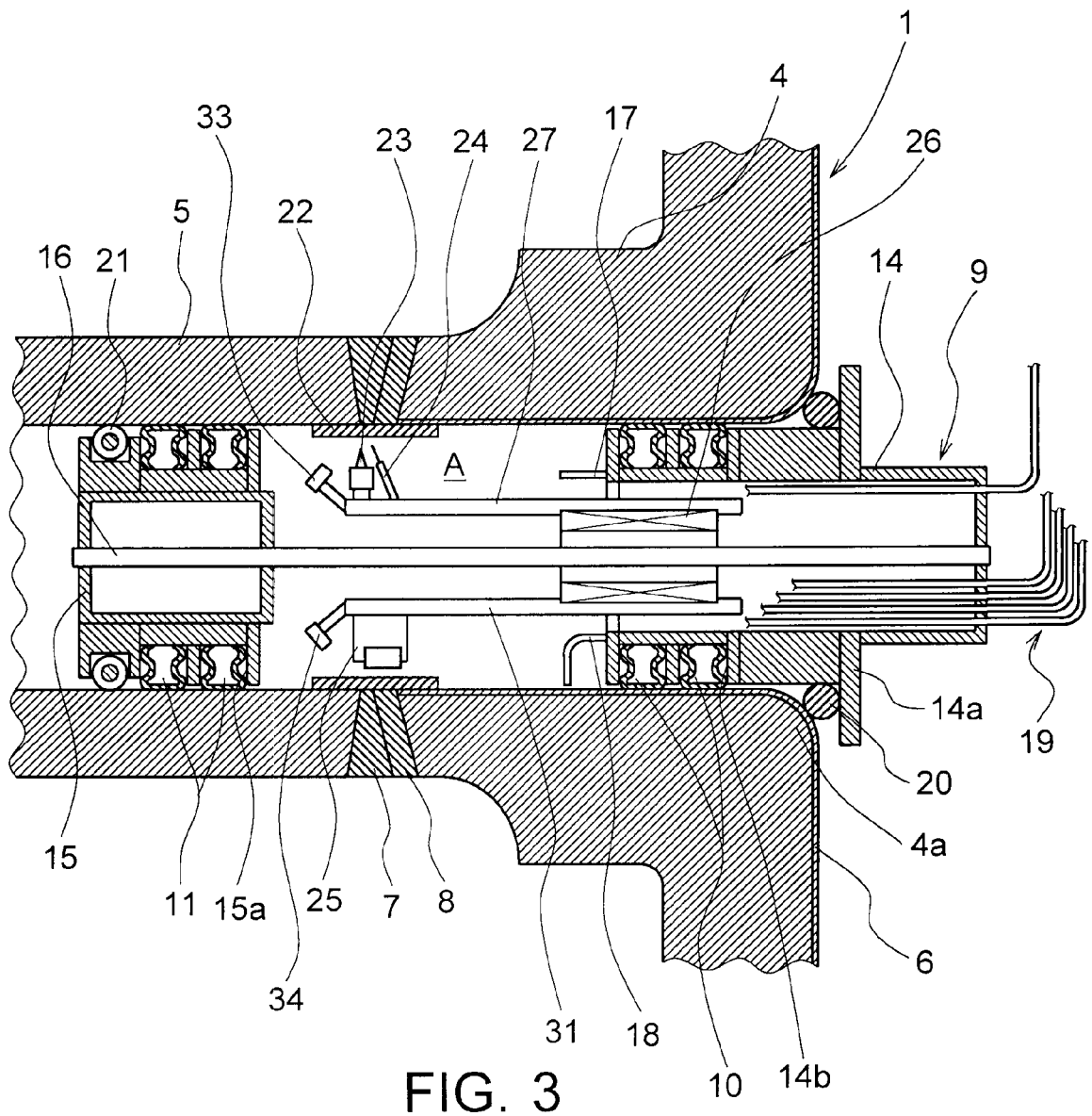
FIG. 3 is a cross-sectional view of a pressure vessel that illustrates a state after the deposit welding.

FIG. 1 is a schematic view of a nuclear reactor pressure vessel employing the preserving apparatus of an embodiment of the present invention. FIG. 2 is a cross-sectional view of a pressure vessel that illustrates a state prior to deposit welding. FIG. 3 is a cross-sectional view of a pressure vessel that illustrates a state after the deposit welding.

In FIG. 1, the reference numeral 1 stands for a pressure vessel, 2 stands for a nuclear reactor well, and 3 stands for an operation floor. The vessel 1 is a pressure vessel of a pressurized water reactor.

As shown in FIG. 2, a nozzle 4 that links the inside of the pressure vessel 1 with the outside is provided in the body portion of the pressure vessel 1. A pipe 5 such as a supply pipe for supplying cooling water into the pressure vessel 1 or an introducing pipe for introducing high-temperature water heated within the pressure vessel 1 into a steam generator is joined to the nozzle 4.

The pressure vessel 1 is made from a low-alloy steel (for example, P-3 or the like). The inner wall surface of the pressure vessel 1 is formed by a clad layer 6 composed of a stainless steel (for example, SUS308 or the like).

The pipe 5 is made from a stainless steel (for example, P-8 or the like). The pipe 5 is joined to the distal end portion of the nozzle 4 via welding joints (welding joint portions) 7, 8 composed of a nickel-base alloy (for example, Inconel (registered trade mark) 82 or Inconel 182).

The preserving apparatus of the present embodiment comprises a seal member 9 that is disposed in front and behind the welded joints 7, 8 that have to be deposit welded within the nozzle 4 and pipe 5 and serves to demarcate and form a closed operation area A within the nozzle 4 and pipe 5, water drainage means 12 for draining the inside of the operation area A demarcated and formed by the seal member 9 and obtaining a gas atmosphere therein, and welding means 13 for deposit welding on the inner surface of the welded joints 7, 8 within the operation area A in which the gas atmosphere has been created.

The seal member 9 is mainly composed of a plurality (two in the present embodiment) nozzle plugs 14, 15 that are inserted with a predetermined spacing into the nozzle 4 and pipe 5, a guide rod 16 that has to connect the plurality of nozzle plugs 14, 15 together and spans between the plurality of nozzle plugs 14, 15, and a seal tube (a first high-pressure seal tube 10 and a second high-pressure seal tube 11) provided so that it can expand and contract (extend and contract) on the outer periphery of the nozzle plugs 14, 15 and serving to seal the space between the nozzle plugs 14, 15 and the inner surface of the nozzle 4 and pipe 5.

The plurality of nozzle plugs 14, 15 include a first nozzle plug 14 that is disposed on the side of the nozzle 4 (right side in FIG. 2) and a second nozzle plug 15 that is disposed at a predetermined distance in the longitudinal direction of the nozzle 4 from the first nozzle plug 14 and disposed on the side of the pipe 5 (left side in FIG. 2). The outer diameters of the first nozzle plug 14 and second nozzle plug 15 are set so that the plugs can be inserted into the nozzle 4 and pipe 5. The first nozzle plug 14 and second nozzle plug 15 are inserted into the nozzle 4 and pipe 5 from the inside of the pressure vessel 1.

The first nozzle plug 14 is formed to have an almost cylindrical shape and one end thereof (right side in FIG. 2) is closed. The second nozzle plug 15 is formed to have an almost cylindrical shape and both ends thereof are closed.

The first nozzle plug 14 is provided with a supply tube 17 and a discharge tube 18 that are open within the operation area A. A wire or hose 19 for supplying utilities such as electric power, air, and shield gas to the seal member 9 is connected to the first nozzle plug 14.

An watertight sealing O-ring 20 designed for sealing the flange 14a facing a corner portion 4a of the nozzle 4 and also between the flange 14a and the corner portion 4a of the nozzle 4 is provided on the outer periphery of the first nozzle plug 14.

A plurality of small wheels 21 disposed with a predetermined spacing in the circumferential direction are provided on the outer periphery of the second nozzle plug 15.

Where the seal member 9 (first nozzle plug 14 and second nozzle plug 15) is inserted into the nozzle 4, the seal member 9 is guided by the small wheels 21 provided at the second nozzle plug 15, advances into the nozzle 4 and pipe 5, and is stopped when the O-ring 20 provided at the first nozzle plug 14 abuts against the corner portion 4a of the nozzle 4.

The first high-pressure seal tube 10 is fitted into a sealing groove 14b provided on the outer periphery of the first nozzle plug 14. The second high-pressure seal tube 11 is fitted into a sealing groove 15a provided on the outer periphery of the second nozzle plug 15.

Where a high-pressure gas (in the present embodiment, air) is supplied into the first high-pressure seal tube 10 and second high-pressure seal tube 11 after the seal member 9 (first nozzle plug 14 and second nozzle plug 15) has been inserted into the nozzle 4 and pipe 5, the first high-pressure seal tube 10 expands and comes into intimate contact with the inner surface of the nozzle 4, whereas the second-high-pressure seal tube 11 expands and comes into intimate contact with the inner surface of the pipe 5.

The water drainage means 12 purges (discharges) water remaining in the operation area A.

The water drainage means 12 creates a gas atmosphere (gas) in the operation area A by supplying high-pressure gas (in the present embodiment, air) into the operation area A through the supply tube 17 and purging the water contained in the operation area A through the discharge tube 18 as the high-pressure gas is supplied through the supply tube 17 into the operation area A. Water introduced into the discharge tube 18 is discharged via a hose 19 into a storage tank (not shown in the figure) disposed at the operation floor 3.

The welding means 13 forms a novel clad layer (deposited layer) 22 (see FIG. 3) that covers the inner surface of the welded joints 7, 8 and also the inner surface of the nozzle 4 and the inner surface of the pipe 5 in the vicinity thereof in order to prevent the occurrence of SCC on the inner surface of welded joints 7, 8.

The welding means 13 has a welding torch 23 (in the present embodiment, a TIG welding torch) that is supported on the guide rod 16 spanning between the first nozzle plug 14 and second nozzle plug 15, so that the welding torch can move in the axial direction and radial direction of the guide rod 16 (nozzle 4) and rotate in the circumferential direction, and a filler rod feeder 24 that feeds a filler rod (welding wire) having corrosion resistance and SCC resistance to the distal end portion of the welding torch 23.

The first nozzle plug 14 is provided with a drive device 26 for moving the welding torch 23 and a below-described grinder 25 in the axial direction and radial direction of the guide rod 16 (nozzle 4) and rotating them in the circumferential direction.

The welding torch 23 and filler rod feeder 24 are attached to a support rod 27 provided at the drive device 26.

The welding means 13 forms the clad layer 22 on the inner surface of the welded joints 7, 8 and also on the inner surface of the nozzle 4 and the inner surface of the pipe 5 in the vicinity thereof by inducing an electric arc discharge between an electrode of the welding torch 23 and the welding surface (inner surface of the welded joints 7, 8 and the inner surface of the nozzle 4 and the inner surface of the pipe 5 in the vicinity thereof) and rotating the welding torch 23 in this state in the circumferential direction of the nozzle 4 with the drive device 26, while controlling the heat input conditions and feeding the filler rod with the filler rod feeder 24.

The preserving apparatus comprises drying means 28, 29 for drying the welding surface prior to deposit welding on the inner surface of the welded joints 7, 8.

The drying means 28 dries the welding surface by supplying a high-pressure gas (in the present embodiment, dry air) at a comparatively high temperature to the operation area A through the supply tube 17.

Further, the drying means 29 dries the welding surface by inducing an electric arc discharge between the electrode of the welding torch 23 and the welding surface and heating the welding surface by using the arc as a heat source, while controlling the heat input conditions without feeding the filler rod.

The preserving apparatus comprises grinding (polishing) means 30 for grinding the welding surface prior to deposit welding on the inner surface of the welded joints 7, 8 and also for grinding the formed clad layer 22 after the deposit welding on the inner surface of the welded joints 7, 8.

The grinding means 30 has a grinder 25 for grinding the welding surface or the formed clad layer 22.

The grinder is attached to the support rod 31 provided at the drive device 26.

The grinding means 30 grinds the welding surface or the formed clad layer 22 by rotating the grinder 25 by the drive device 26 in the circumferential direction of the nozzle 4 in a state in which the grinder 25 is brought into contact with the welding surface or the formed clad layer 22.

The preserving apparatus comprises inspection means 32 for inspecting the welding surface prior to deposit welding on the inner surface of the welded joints 7, 8 and also for inspecting the formed clad layer 22 after the deposit welding on the inner surface of the welded joints 7, 8.

The inspection means 32 has cameras (CCD cameras) 33, 34 that are respectively mounted on the support rod 27 where the welding torch 23 is mounted and the support rod 31 where the grinder 25 is mounted.

The inspection means 32 picks up the image of the welding surface or the formed clad layer 22 with the cameras 33, 34 and displays the image on a monitor (not shown in the figure). The external appearance inspection is performed by observing the welding surface or the formed clad layer 22 with the monitor.

The preserving apparatus comprises shield gas supply means 35 for supplying a shield gas to the operation area A and creating a shield gas atmosphere in the operation area A prior to deposit welding on the inner surface of the welded joints 7, 8.

The shield gas supply means 35 creates the shield gas atmosphere in the operation area A by supplying an inert gas (for example, argon gas (Ar) or the like) as the shield gas to the operation area A via the supply tube 17.

The preserving method of the present embodiment will be described below.

[Step 1] The nuclear reactor well 2 is filled with water (see FIG. 1).

[Step 2] The instruments and materials such as the seal member 9 (first nozzle plug 14 and second nozzle plug 15), a cylinder 36, a seal member (nozzle plug) operation unit 37, a cylinder operation unit 38, a hose or wire are transported to the operation floor 3 (see FIG. 1).

[Step 3] The seal member 9 and cylinder 36 are placed on a conveying beam 39 and the conveying beam 39 is suspended with a crane (ceiling crane) 40 installed on the operation floor 3 and moved into the pressure vessel 1 (see FIG. 1). The seal member 9 is inserted into the nozzle 4 and pipe 5 with the cylinder 36 in a state in which the conveying beam 39 is suspended to a predetermined height within the pressure vessel 1.

[Step 4] The space between the nozzle 4, pipe 5 and seal member 9 (first nozzle plug 14 and second nozzle plug 15) is sealed with the first high-pressure seal tube 10 and second high-pressure seal tube 11 and then the air is supplied into the operation area A, water remaining in the operation area A is discharged, and a gas atmosphere is created in the operation area A.

The supply is then switched to dry air, the dry air is supplied within a predetermined interval (for example, about 3 h) into the operation area A, and the welding surface is dried.

After the welding surface has been dried, the supply is switched to a shield gas, the shield gas is supplied to the operation area A, and the shield gas atmosphere is created in the operation area A. The purging state of the operation area A is verified by measuring the concentration of oxygen in the shield gas discharged from the discharge tube 18 (hose 19).

[Step 5] If necessary, the welding surface is ground with the grinder 25 and foreign matter such as dust or clad material that adhered to the welding surface is removed.

[Step 6] The welding surface is dried and water contained in the SCC present in the welded joints 7, 8 is evaporated by inducing an electric arc discharge between the electrode of the welding torch 23 and the welding surface, using the arc as the heat source, and heating to a predetermined temperature (about 100° C.), while controlling the heat input conditions without feeding the filler rod.

The state of the welding surface is then picked up with the cameras 33, 34 and displayed on the monitor, and the welding surface state is checked for abnormalities.

[Step 7] After the state of the entire welding surface has been verified, an electric arc discharge is induced between the electrode of the welding torch 23 and the welding surface, while controlling the heat input conditions and feeding the filler rod, the filler rod is melted, and a clad layer 22 composed of a predetermined number of layers (three layers in the present embodiment) that covers the welded joints 7, 8 is formed on the inner surface of the welded joints 7, 8 and on the inner surface of the nozzle 4 and the inner surface of the pipe 5 in the vicinity thereof (see FIG. 3).

[Step 8] The state of the formed clad layer 22 is picked up with the cameras 33, 34 and displayed on the monitor, and the state of the formed clad layer 22 is checked for abnormalities.

[Step 9] If necessary, the formed clad layer 22 is ground with the grinder 25.

[Step 10] Foreign matter present in the operation area A is vacuum recovered through the discharge tube 18 (hose 19).

[Step 11] The seal member 9 (first nozzle plug 14 and second nozzle plug 15) is removed from the nozzle 4.

As described hereinabove, in the present embodiment, the closed operation area A is demarcated and formed within the nozzle 4 and pipe 5 in front and behind the welded joints 7, 8 that have to be deposit welded, the inside of the demarcated operation area A is drained and a gas atmosphere is created therein, and deposit welding is performed on the inner surface of the welded joints 7, 8 in the operation area A in which the gas atmosphere has been created. Therefore, the deposit welding can be performed under gas environment, and sufficient welding quality can be ensured.

The preferred embodiment of the present invention is described above, but the present invention is not limited to the above-described embodiment, and a variety of other embodiments thereof can be employed.

For example, the inspection means may have a penetration defectoscopy device.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A preserving apparatus for a welded joint portion, for deposit welding on an inner surface of a welded joint portion, in which a nozzle and a pipe supported under water are joined, and preserving the welded joint portion, comprising:
   a seal member that is disposed in front and behind the welded joint portion to be deposit welded within the nozzle and the pipe, and serves to demarcate and form a closed operation area within the nozzle and the pipe;
   water drainage means for draining the inside of the operation area demarcated and formed by the seal member and obtaining a gas atmosphere therein; welding means for deposit welding on the inner surface of the welded joint portion within the operation area in which the gas atmosphere has been created; and
   drying means for drying the welded joint portion prior to deposit welding on the inner surface of the welded joint portion;
   wherein the seal member has a plurality of nozzle plugs that are inserted, with a predetermined spacing, into the nozzle and the pipe, and a seal tube that is provided so as to expand and contract on the outer periphery of each of the nozzle plugs and serves to seal the space between the nozzle plugs and the inner surfaces of the nozzle and the pipe;
   the welding means comprises a guide rod that spans between the plurality of nozzle plugs, and a welding torch that is supported on the guide rod so that the welding torch can move freely in the axial direction and radial direction of the guide rod and can rotate freely in the circumferential direction; and
   the drying means drying the welding surface by inducing an electric arc discharge between the electrode of the welding torch and the welding surface and heating the welding surface by using the arc as a heat source, while controlling the heat input conditions without feeding the filler rod.

2. The preserving apparatus for a welded joint portion according to claim 1, wherein the water drainage means comprises a supply tube that supplies a gas into the operation area, and a discharge tube that drains the operation area as the gas is being supplied from the supply tube into the operation area.

3. The preserving apparatus for a welded joint portion according to claim 1, comprising grinding means for grinding the welded joint portion.

4. The preserving apparatus for a welded joint portion according to claim 1, comprising inspection means for inspecting the welded joint portion.

5. The preserving apparatus for a welded joint portion according to claim 1, comprising shield gas supply means for supplying a shield gas into the operation area and creating the shield gas atmosphere within the operation area, prior to deposit welding on the inner surface of the welded joint portion.

6. A preserving method for a welded joint portion, for deposit welding on an inner surface of a welded joint portion, in which a nozzle and a pipe supported under water are joined, and preserving the welded joint portion,
   wherein a closed operation area is demarcated and formed in front and behind the welded joint portion to be deposit welded, water is drained from within the demarcated operation area and a gas atmosphere is created therein, and deposit welding is performed using a welding torch on the inner surface of the welded joint portion within the operation areas in which the gas atmosphere has been created, and when the welded joint portion is dried prior to deposit welding on the inner surface of the welded joint portion, the welding surface is dried by inducing an electric arc discharge between the electrode of the welding torch and the welding surface and heating the welding surface by using the arc as a heat source, while controlling the heat input conditions without feeding the filler rod.

7. The preserving method for a welded joint portion according to claim 6, wherein a gas is supplied into the operation area and the operation area is drained as the gas is being supplied into the operation area.

8. The preserving method for a welded joint portion according to claim 6, wherein the welded joint portion is ground prior to deposit welding on the inner surface of the welded joint portion.

9. The preserving method for a welded joint portion according to claim 6, wherein the welded joint portion is inspected prior to deposit welding on the inner surface of the welded joint portion.

10. The preserving method for a welded joint portion according to claim 6, wherein a shield gas is supplied into the operation area and the shield gas atmosphere is created within the operation area, prior to deposit welding on the inner surface of the welded joint portion.

11. The preserving method for a welded joint portion according to claim 6, wherein the welded joint portion is ground after deposit welding on the inner surface of the welded joint portion.

12. The preserving method for a welded joint portion according to claim 6, wherein the welded joint portion is inspected after deposit welding on the inner surface of the welded joint portion.

* * * * *